July 31, 1923.
C. T. ADAIR ET AL
1,463,303
SURFACING MACHINE
Filed March 31, 1922
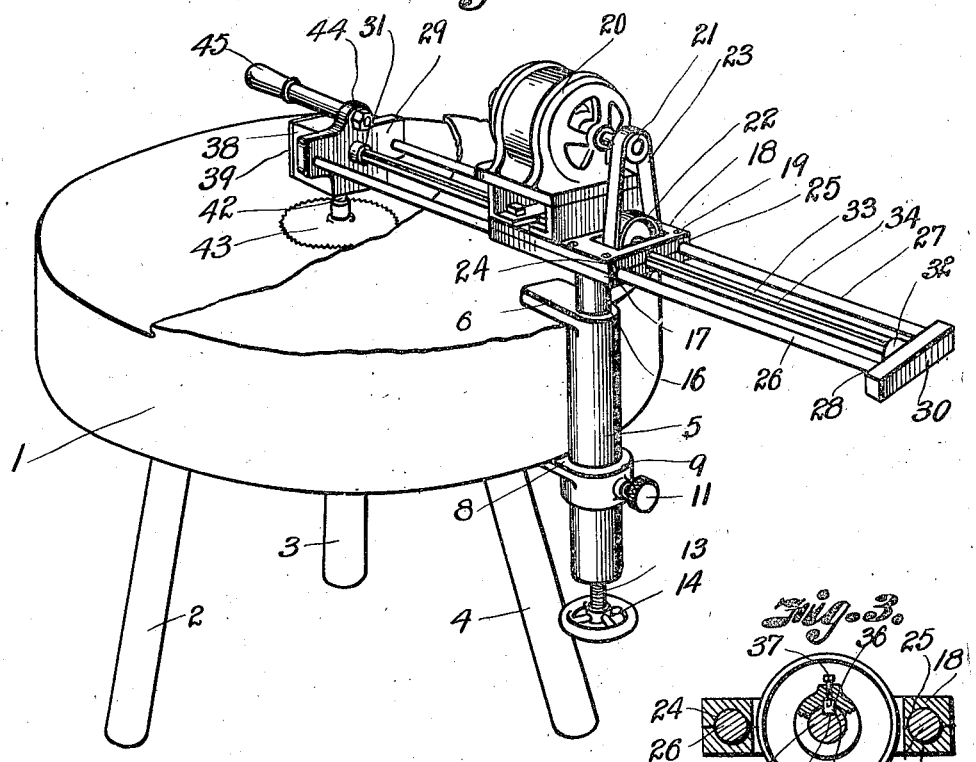
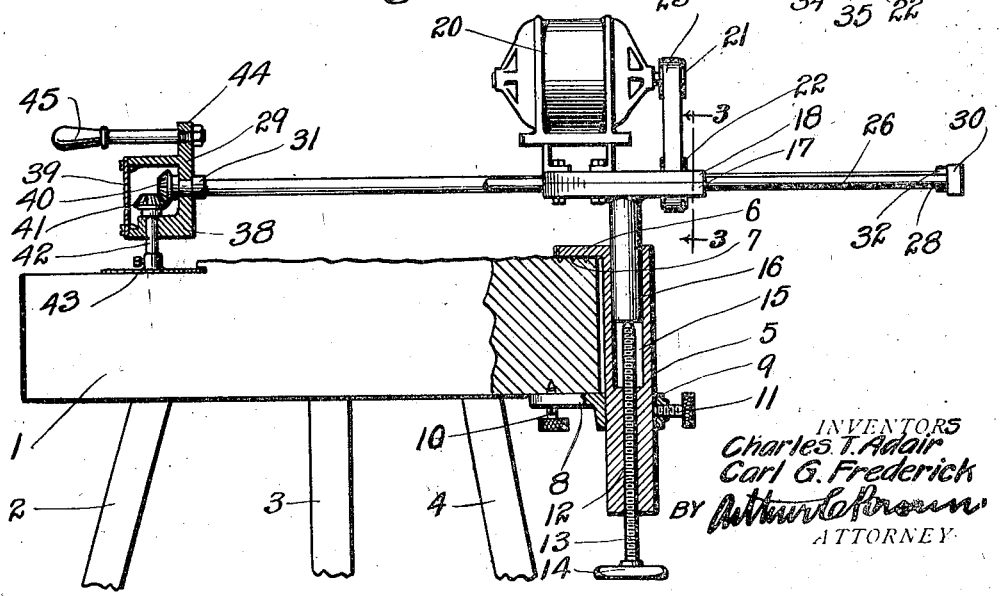
INVENTORS
Charles T. Adair
Carl G. Frederick
BY
ATTORNEY Patented July 31, 1923.

1,463,303

UNITED STATES PATENT OFFICE.

CHARLES T. ADAIR AND CARL G. FREDERICK, OF KANSAS CITY, MISSOURI.

SURFACING MACHINE.

Application filed March 31, 1922. Serial No. 548,306.

*To all whom it may concern:*

Be it known that we, CHARLES T. ADAIR and CARL G. FREDERICK, citizens of the United States, residing at Kansas City, in the county of Jackson and State of Missouri, have invented certain new and useful Improvements in Surfacing Machines; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to surfacing machines and particularly to a machine for re-surfacing butchers' blocks although it is applicable for surfacing any block or board not exceeding the capacity for which the machine is designed, for example, table tops and the like may also be re-surfaced although as above stated, the machine is primarily intended for re-surfacing butchers' blocks.

The invention broadly contemplates the provision of means whereby the machine can be conveniently attached to the block and whereby a circular saw may be driven from a suitable source of power, the saw being supported upon a slidable arm having swinging movement about the axis of its support, the arm being so mounted that it may be manually operated as to position so as to move the saw about an area complementary to the portion of the block to be re-surfaced.

The simplicity of construction, ease of manipulation and efficiency of result will be manifest by reference to the following description in connection with the accompanying drawings, in which Fig. 1 is a perspective view of a machine constructed in accordance with our invention, the machine being illustrated as applied to a block to be re-surfaced.

Fig. 2 is a view partly in elevation and partly in section of a block and a machine applied thereto, and Fig. 3 is a sectional view on the line 3—3 of Fig. 2.

The reference numeral 1 designates a butcher's block of conventional construction, supported upon the legs 2, 3 and 4 in the usual manner, and it is shown as being partially re-surfaced by a machine, the construction of which is in accordance with our invention.

The support or base of the machine is shown as consisting of a tubular member 5, having a lateral jaw 6 at its upper end, preferably provided with teeth or tines 7 to engage the upper surface of the block to prevent slipping thereof.

There is a vertically adjustable, complementary jaw 8 supported by the ring 9, sleeved on the tubular member 5, the jaw 6 co-operating with the jaw 8 as a clamping means for securing the member 5 rigid with respect to the block.

The jaw 8 is provided with a threaded spur 10, which can be adjusted so that the spur can engage into the block at any desired depth and the ring 9 may be fastened at any adjusted position by means of a set screw 11.

Within the lower portion of the tubular member 5 is a threaded bore 12 to receive an adjusting screw 13 having a hand wheel 14 for operating it. The upper end of the screw 13 extends into the counter bore 15 in the tubular member 5, which receives a swivel 16, the lower end of the swivel abutting against the upper end of the screw 13 so that when the screw 13 is operated, the swivel will be raised or lowered, it being obvious that a recession of the screw will permit the swivel to slide down into the counter bore 15 and when the screw is projected into the counter bore 15, the swivel 16 will be raised.

The swivel depends from the bottom of a combined motor support and cutter arm supporting guide, shown as comprising two plates 17 and 18, fastened together by a fastening device 19. The swivel 16 may be cast integral with the bottom plate 17 or it may be separately secured thereto in an obvious manner.

Supported upon the top plate 18 is an electric motor 20, receiving current from any suitable source and on the shaft thereof is a pulley 21, driving a pulley 22 carried by the plates 17 and 18 through the medium of a belt 23.

The plates 17 and 18 are provided with half round grooves which, when the plates are brought together, constitute cylindrical guideways 24 and 25 to receive the rods 26 and 27 of the adjustable arm 28. The rods 26 and 27 are connected at their ends by end bars 29 and 30 and these end bars are provided with bearings 31 and 32 to receive a rotatable shaft 33.

The rotatable shaft is provided with a longitudinal groove 34, which extends from end to end and it receives a key 35, the key 35 being also received in the groove 36 in the pulley 22 and there being an adjusting screw 37 (see Fig. 3) to maintain the key or feather 35 in engagement with the groove 34 so that when the arm 28 is slid longitudinally, there will always be driving connection between the pulley and the shaft 33 because the key or feather 35 will have a loose fit in the groove 34.

The end bar 29 is provided with a bearing box 38, having a removable cover or end wall 39 so that grease or other lubricant can be introduced into the box and within the box on the end of the shaft 33 is fixed a beveled gear 40, meshing with a beveled gear 41 on the shaft 42, journaled in the bottom of the box 38. The shaft 42 extends below the box and carries a circular saw 43 thereon, which will partake of the motion of the shaft 42 when the gear 41 is driven through the gear 40 on the shaft 33.

Projecting from the top of the box is a lug or ear 44, to which is fastened a handle 45 which may be grasped by the operator to manipulate the arm to swing the saw over the entire surface of the block or other device to be re-surfaced. It is to be understood, of course, that the shaft 33 also extends through the support and guide consisting of the plates 17 and 18.

When the parts are assembled and it is desired to re-surface the block, the sub-base or support 5 is clamped upon the block, as shown in Figs. 1 and 2. Then the screws 13 is manipulated to raise and lower the motor base and arm supporting guide until the saw is in the proper place to take off the high places of the block. The screw can be manipulated to raise and lower the saw at will and the operator can observe the depth of the depression in the block so that there will not be an excess of the surface removed, it being desirable to only remove such portions of the block as will give a flat surface to the top thereof.

When the parts have been properly adjusted, the operator will grasp the handle 45, turn on the current to drive the motor 20 so that shaft 33 will be driven to operate the saw through the gears 40 and 41 and the shaft 42, and the saw can then swing in either arc to the right or left because the swivel 16 loosely fits within the counter bore 15 and has a point contact with the end of the screw 13.

The arm can be moved longitudinally by pressing or pulling upon the handle 45 because the guide rods 26 and 27 have a loose fit in their support and guide, as does also the shaft 33 which receives its motion from the pulley 26 through the medium of the belt 23 and the pulley 22.

It will be apparent, of course, that there will be considerable freedom of movement of the saw because it can be swung either laterally or back and forth, as the occasion or the judgment of the operator dictates.

The sub-base, consisting of the tubular member 5, may be fastened to any thickness of block because the collar 9 is adjustable thereon and it carries the movable jaw 8. Any thickness of cut may be made by the saw 43 provided it is not thicker than the distance between the saw and the bottom of the box 38. Ordinarily, however, a very thin cut will be made because the thinner the cut at each operation, the longer the block will be effective to give service.

The device can be readily applied and detached from the block and operated in a most convenient and effective manner, the surfacing being accomplished in a very small period of time and the result being entirely satisfactory, as has been demonstrated in actual practice.

Attention is called to the fact that the guide which supports the motor constitutes an intermediate bearing for the drive shaft and that the shaft is supported intermediate its ends as well as at its ends by this guide because when the arm is moved back and forth, there is always an intermediate support for the shaft irrespective of the position of the arm. This is an important feature because with a shaft as long as the drive shaft, there will be liability of warping or chattering if some intermediate support were not provided.

What we claim and desire to secure by Letters-Patent is:

1. A surfacing machine comprising a base, means for clamping the base to the work to be surfaced, a plate having a swivel mounted in the base, a second plate fastened to the first plate, an arm comprising a skeleton frame consisting of side bars and end bars, the side bars being slidable in grooves in the two plates, a shaft journaled in the end bars and slidable between the two plates, the shaft having a longitudinal groove, a pulley mounted in the plates and having a keyed connection with the groove in the shaft, a motor carried by one of the plates, a driving connection between the motor and the pulley, and a saw carried by one of the end bars and in driving connection with the shaft.

2. A surfacing machine comprising a tubular member having a rigid jaw at one end to engage the work to be surfaced, an adjustable jaw sleeved on the tubular member to engage the work to be surfaced whereby the work will be clamped between the two jaws, a swivel slidable in a recess in the tubular member, a screw having threaded connection with the tubular member and adapted to vertically adjust the swivel, a sliding arm supported by the swivel, a saw carried by the arm, and means for operating the saw.

3. In a surfacing machine, a supporting base, means for clamping the base to the work to be surfaced, a swivel carried by the base, an arm guide at the upper end of the swivel, an arm slidable in the guide, a saw at one end of the arm, and an operating shaft extending longitudinally of and substantially co-extensive with the arm, the shaft extending through a bearing in the guide so that the shaft will be supported intermediate its ends at whatever position the arm assumes with respect to the guide.

4. In a surfacing machine, a support, means for clamping the support to the work, a swivel mounted in the support, an arm support and guide, means carried by the swivel, a freely slidable arm carried by said support and guide, means adapted to swing with it about the axis of the swivel, a shaft supported by the arm, a saw carried by the arm, and means on the arm for rotating the shaft, the shaft having free slidable movement with respect to the last named means so that when the arm is slid back and forth with respect to the support and guide means the shaft will move with said arm.

In testimony whereof we affix our signatures.

CHARLES T. ADAIR.
CARL G. FREDERICK.